United States Patent [19]
Kehne

[11] Patent Number: 5,152,657
[45] Date of Patent: Oct. 6, 1992

[54] BOAT TRAILER ATTACHMENT

[76] Inventor: Lewis F. Kehne, W. 2925 Rosewood, Spokane, Wash. 99208

[21] Appl. No.: 681,933

[22] Filed: Apr. 8, 1991

[51] Int. Cl.$^5$ ............................................. B60P 3/10
[52] U.S. Cl. .............................. 414/534; 280/414.1; 414/529; 414/569
[58] Field of Search ............... 414/529, 530, 531, 532, 414/533, 534, 535, 536, 538, 506, 571, 569, 462; 280/414.1, 414.2, 414.3

[56] References Cited

U.S. PATENT DOCUMENTS

| | | | |
|---|---|---|---|
| 2,608,314 | 8/1952 | Krider | 414/534 X |
| 3,069,038 | 12/1962 | Ahlbin | 280/414.1 X |
| 3,113,686 | 12/1963 | Sundin | 280/414.1 X |
| 3,848,892 | 11/1974 | Reder | 280/414.1 |
| 4,687,219 | 8/1987 | Rendzio | 414/536 X |
| 4,820,111 | 4/1989 | Godbersen | 280/414.1 X |

*Primary Examiner*—Frank E. Werner

[57] ABSTRACT

An attachment for use with a boat trailer previously equipped with an upstanding post secured to a trailer tongue, and a winch with a rope mounted near the upper end of said post. The attachment includes a third class lever pivotally connected at the forward end to a shackle secured to the trailer tongue, and further supported and horizontally restained near the rearward end of the lever by a support shackle also secured to the trailer tongue, the free rearward end of the lever terminating in a bracket with a roller supporting the forward keel of a boat in transit. The winch rope end may be secured between ends of the lever so that operation of the winch causes the lever to move vertically upwards, from its support position, in an arc centered at the lever pivotal connection. The terminal end of the lever with its attached roller consequently moves vertically upward in the previously described arc along the bow of said boat lifting said boat from its transit position and pushing said boat rearwardly in respect to said trailer.

7 Claims, 2 Drawing Sheets

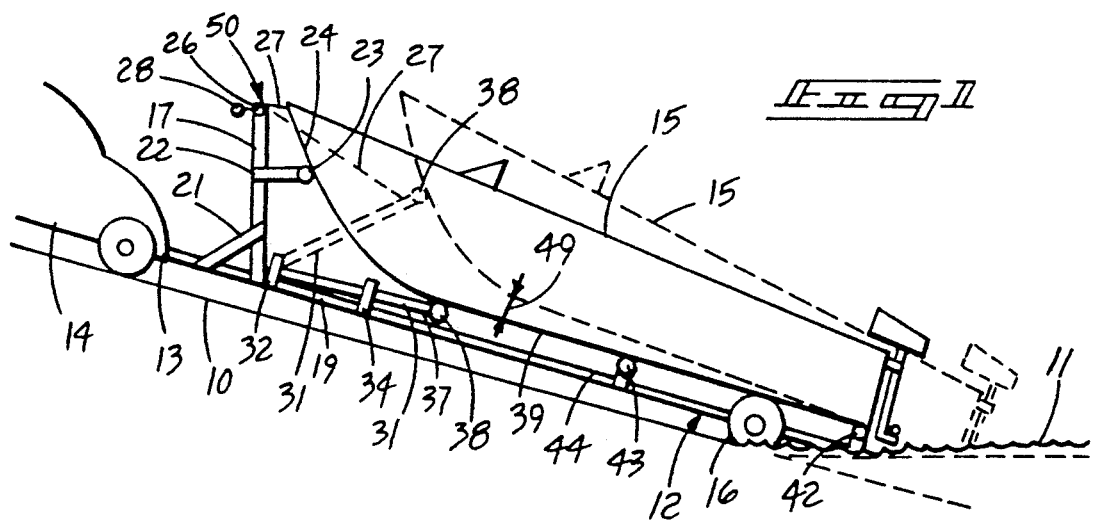
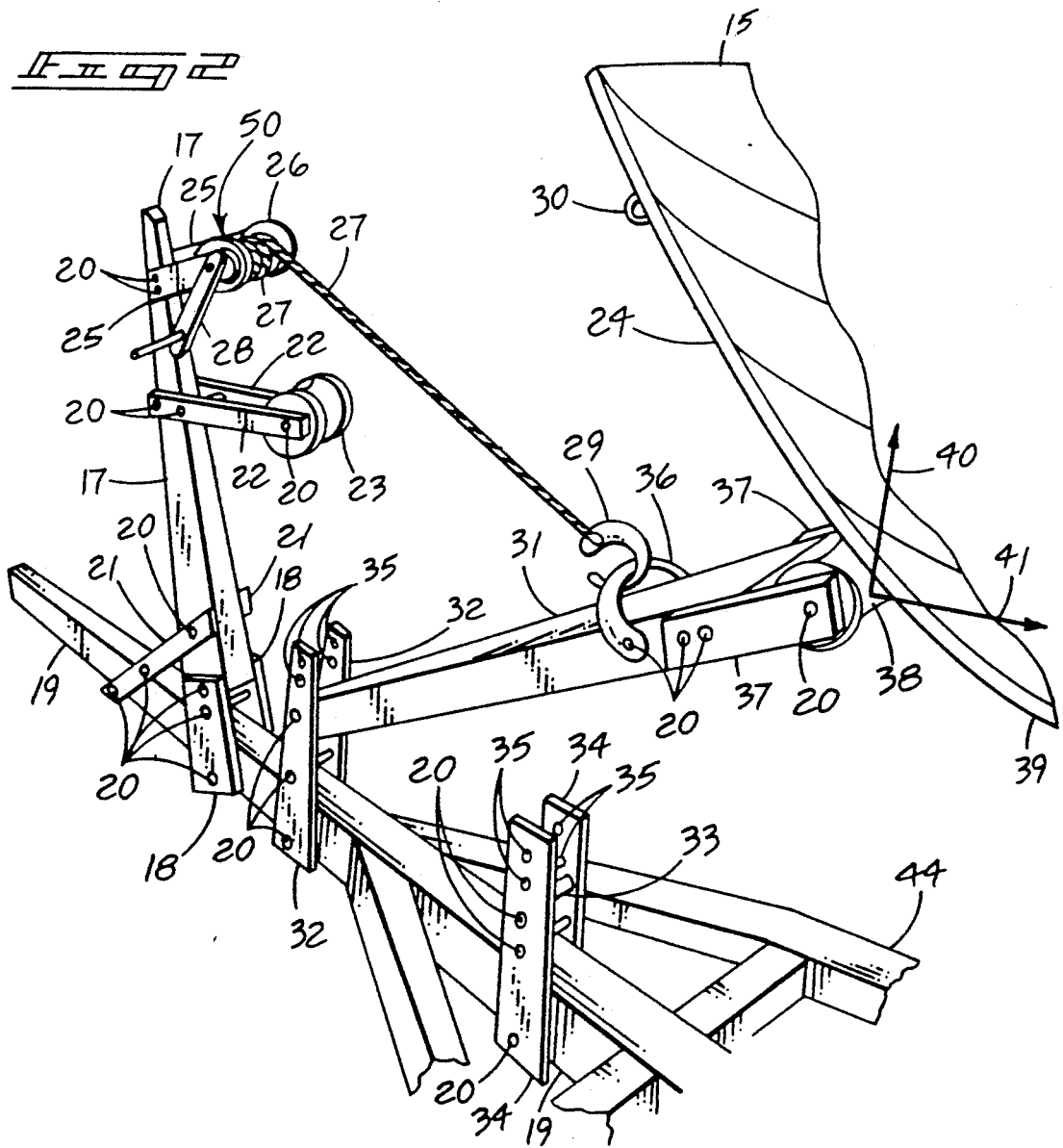

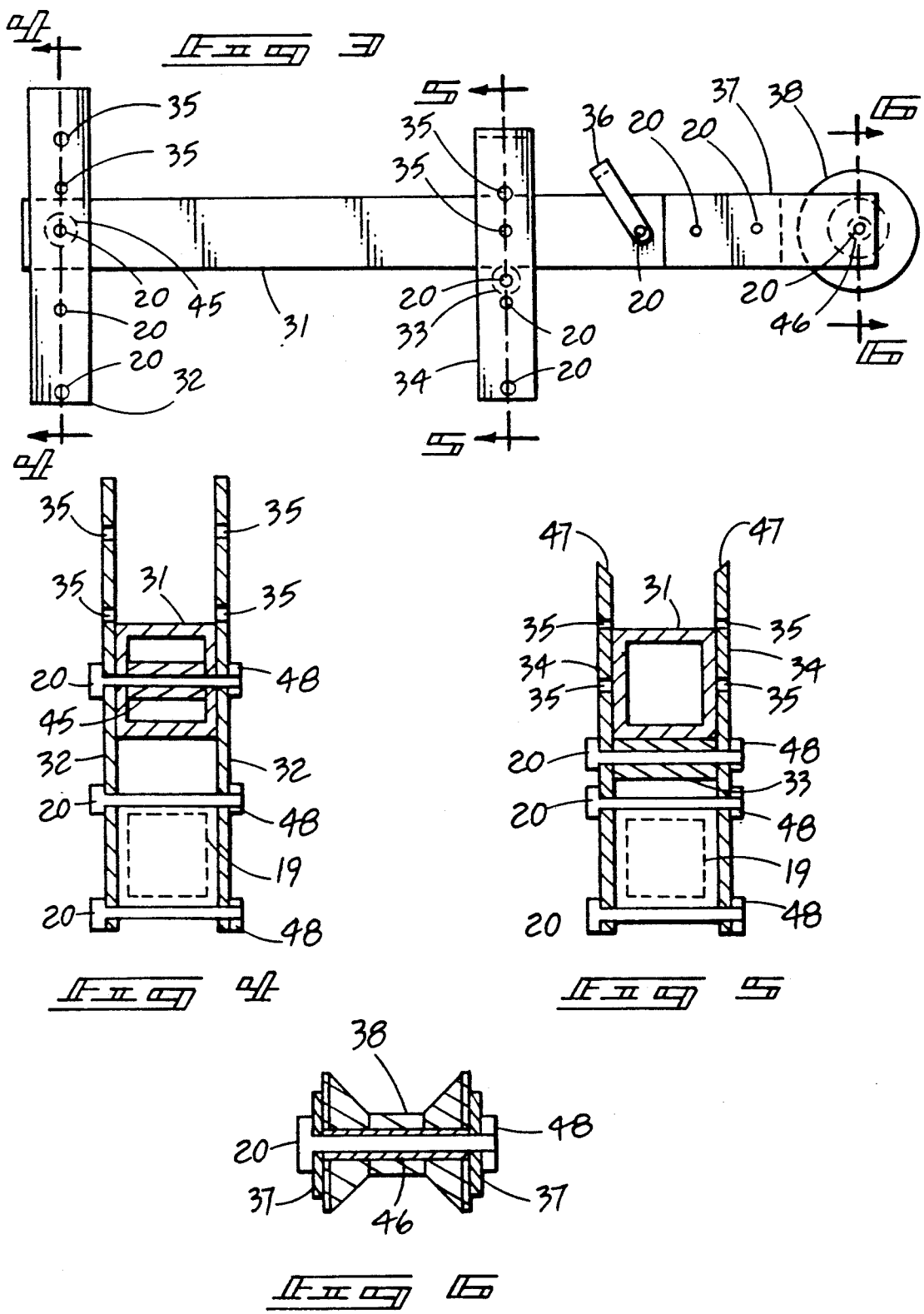

BOAT TRAILER ATTACHMENT

This invention relates to an attachment to a boat trailer with mechanical arrangements for supporting the forward keel of a boat and launching the boat.

Fishing and pleasure boating have become major recreational pursuits. Boats are generally transported over land on boat trailers coupled to motor vehicles, and often launched and loaded on a daily basis. A majority of the boat trailers have a roller support system to support the boat hull in transit and to facilitate launching and loading. Some trailers are equipped with a forward keel support for additional boat stability during transport. However, when a forward keel support is not present, excessive strain is put on the boat hull by the individual rollers of the roller support system. Hairline cracks in the boat hull with seepage often develops at the point of roller contact after the boat has been towed extensively over bumpy roads or rough terrain.

Most trailers have a bow stop device to limit forward movement of the boat on the trailer.

Practically all boats have a winch system to pull the boat from the water on to the boat trailer. However, few if any boat trailers have a mechanical system to assist in launching the boat. In many instances a strenuous effort on the part of the operator is required to initiate launching. This involves an upward lift and a rearward push to clear the boat of the bow stop and the forward keel support, if present, and at the same time overcome inertia of the boat and rollers, after which gravitational force moves the boat quickly over the boat hull support rollers into the water.

Many systems have been invented for unloading boats from boat trailers, but they are not in general use because they are either undependable, ineffective, expensive, complicated, combersome, or difficult to manufacture, install, operate and maintain. Plausible but seldom used inventions are cited in the following U.S. patents:

U.S. Pat. No. 3,038,617 granted Jun. 12, 1962 to Seegrist

U.S. Pat. No. 3,069,038 granted Dec. 15, 1962 to Ahlbin

U.S. Pat. No. 3,176,865 granted Apr. 6, 1965 to Faul et al

U.S. Pat. No. 3,768,677 granted Oct. 30, 1973 to Moss

U.S. Pat. No. 3,848,892 granted Nov. 19, 1974 to Redev.

A hinged tongue, tiltable bed, boat trailer was the vogue at one time, but a fixed tongue trailer is safer, simpler to operate and more economical to manufacture and maintain. The hinged tongue tiltable bed boat trailer has since given way to a unique "boat hull engaging means" as exemplified in the following U.S. patents.

U.S. Pat. No. 3,785,677 granted Jan. 15, 1974 to calkins

U.S. Pat. No. 4,717,165 granted Jan. 5, 1988 to Johnson.

These are of assistance in launching and loading boats on present art trailers. However, greater stability and less hull stress could be attained if a forward keel support was installed in all instances. It would therefore, be highly desirable to combine a forward keel support with a boat launching device that could be installed on existing and new boat trailers.

It is an object of this invention to provide a simple, dependable, inexpensive boat trailer mechanical attachment to support the forward keel of a boat and be conveniently available for initiating the movement of the boat off a boat trailer.

It is another object of the invention to provide an adjustable forward boat keel support and mechanical attachment to aid in launching a boat off a trailer which can be easily retrofitted on to existing trailers.

It is a further object of the invention to provide an attachment which utilizes the existing winch found on most boat trailers to activate the launching device.

This invention is therefore, an inexpensive boat trailer attachment with an easily adjustable forward keel support which is utilized to provide initial launching action of a boat from a trailer.

FIG. 1 is a schematic side view illustrating a trailer transporting a boat backed down a launching ramp, the trailer having an attachment, described in the invention for supporting the forward boat keel with provisions for initiating movement of the boat from the boat trailer FIG. 2 is a perspective view of the attachment on the trailer.

FIG. 3 is a side elevation view of the attachment in its entirety.

FIG. 4 is a sectional view taken along the lines 4—4 of FIG. 3.

FIG. 5 is a sectional view taken along the lines 5—5 of FIG. 3.

FIG. 6 is a sectional view taken along the lines 6—6 of FIG. 3.

FIG. 1 shows an inclined boat ramp 10 extending into the water 11. A boat 15 is supported by rollers 38, 42, and 43 on a boat trailer 12, coupled by a convential hitch 13 to a motor vehicle 14, which has been backed down the ramp 10 until the trailer wheels 16 engage the water 11. At this point the boat 15 is ready to be launched in to the water 11.

Referring particularly to FIG. 2 an upright post 17 is fastened by post shackle 18 to a trailer tongue 19 with bolts 20 and nuts (not shown). Post 17 is further stabilized by post brace 21 which is secured by bolts 20 to post 17 and tongue 19. Also secured by bolts 20 to post 17 is the bow stop shackle 22 which bears bow stop roller 23 on bolt 20. Bow stop roller 23 when in contact with bow 24 limits the forward movement of the boat 15 on the trailer 12 as shown in FIG. 1. Winch 50 in FIGS. 1 and 2 is secured to post 17 near its upper end by bolts 20 in winch base 25 coupled to a rotatable drum 26 with a rope 27 wound on the drum 26 and a handle 28 for rotating the drum 26 to pay out and take in the rope 27 which is secured to hook 29. Hook 29 is normally engaged with bow eye 30 when the boat 15 is in transit. Bow eye 30 is securely fastened to the boat 15 at the bow 24.

The attachment as illustrated during the launching operation in FIG. 2 includes a rearward pointing class three lever 31 vertically and pivotally attached at one end to pivot shackle 32 by bolt 20. Lever 31 is an elongated hollow member of rectangular cross section. The pivot shackle 32 is secured by bolts 20 to the trailer tongue 19. The lever 31 is normally supported during transit, a shown in FIG. 3, by bushing 33 on a bolt 20 in support shackle 34 secured by bolts 20 to trailer tongue 19. A clevis 36, referred to in FIGS. 2 and 3, is attached by bolt 20 to lever 31 to accommodate hook 29 attached to rope 27 before activating lever 31.

Referring to FIGS. 2 and 3, a keel roller bracket 37 is attached to the rearward end of lever 31 by bolts 20 and bears the keel roller 38 on bolt 20.

Referring to FIG. 2. lever 31 is activated by winding rope 27 on to drum 26 during the launching operation. The rearward end of lever 31 then moves vertically upward in an arc centered at the pivot end of lever 31 pivoted on bolt 20 in pivot shackle 32 as shown in FIGS. 1 and 2. Keel support roller 38 moves vertically upward in an arc along the bow 24 from its keel support position where it supported keel 39 as shown in FIG. 1 before initiating the launching operation.

FIG. 2 shows keel support roller 38 exerting an upward component of force 40 on boat 15 as lever 31 activation is initiated. However, a rearward component of force 41, in respect to trailer 12, on boat 15 quickly develops as the keel support roller 38 moves in its upward arc along the bow 24.

FIG. 3 is a side elevation view of the entire attachment. However, dimensions and positioning are left to the discretion of the installer skilled in the arts.

FIG. 4 is a cross sectional view taken along lines 4—4 of FIG. 3 showing pivot shackle 32 having aligned holes accommodating bolt 20 which extends through pivot bushing 45 and the aligned holes of lever 31 and is secured by nut 48. Pivot bushing 45 provides stability to lever 31 where it is pivotally attached within pivot shackle 32. Clearance between lever 31 and pivot shackle 32 is at the discretion of those skilled in the art. Broken lines indicate a trailer tongue 19 to which pivot shackle 32 has been secured by bolts 20 and nuts 48 through aligned holes in pivot shackle 32. However, an installer skilled in the art could conceivably secure pivot shackle 32 to post 17. FIG. 2. Additional aligned holes 35 are provided in pivot shackle 32 to allow vertical adjustment of the pivotal position of lever 31 and consequently the vertical position of keel support roller 38 (FIG. 1).

FIG. 5 is a cross sectional view taken along lines 5—5 of FIG. 3 showing support shackle 34 having aligned holes accommodating bolt 20 which extends through support bushing 33 and is secured by nut 48. Support bushing 33 freely supports lever 31. However, support shackle 34 restricts horizontal movement of lever 31. Clearance between support shackle 34 and lever 31 is at the discretion of those skilled in the art. Broken lines indicate a trailer tongue 19 to which support shackle 34 has been secured by bolts 20 and nuts 48 through aligned holes in support shackle 34. The upper ends of support shackle 34 are chamferred 47 to better accommodate lever 31 as it is returned to its supported position after launching. Additional aligned holes 35 are provided in support shackle 34 to allow vertical adjustment of the support bushing 33 position and consequently lever 31 and keel support roller 38 (FIG. 1).

FIG. 6 is a cross sectional view along lines 6—6 of FIG. 3 showing keel support roller bracket 37 having aligned holes accommodating bolt 20 which extends through the keel support roller bushing 46 and is secured by nut 48. Keel support roller bushing 46 fixed in keel support roller 38 allows freely rotating movement of roller 38 on bolt 20.

In transit and before launching as shown in FIG. 1, the boat 15 is supported on the trailer 12 by keel support roller 38 as well as rear 42 and mid 43 hull support rollers attached to the trailer frame 44. Rollers 42 and 43 as depicted in FIG. 1 only represent state of the art boat-hull engaging support means as exemplified in previously cited U.S. Pat. Nos. 3,785,677 and 4,717,165.

Referring to FIG. 2, after forces 40 and 41, which came into being as the result of winch 50 action, have acted on boat 15 and initiated launching. the angle of incidence 49 (FIG. 1) has increased between boat 15 and dashed line boat 15 to the extent gravitational forces complete the launching process.

From the above it is obvious that winch 50 (FIGS. 1 and 2) does in fact provide the motivating power for launching boat 15.

Although the invention has been illustrated by drawings and described in detail herein. it is to be understood that the same may be varied within the scope of the appended claims, without departing from the spirit of the invention.

What is claimed is:

1. An attachment for use with a boat trailer having a winch with spool and a rope wound thereon for pulling a boat from the water, said winch being mounted on a post located on a tongue of the trailer said attachment comprising:
   a. a two ended hollow rectangular cross section lever terminating in a forward pointing pivotal end. an opposite rearward pointing end terminating in a keel support bracket bearing a keel support roller.
   b. means for a pivotal coupling of said pivotal end of said lever to a pivot shackle having upstanding legs permitting pivotal movment of the lever in a vertical plane.
   c. means for securing said pivotal shackle to said trailer tongue in a rearwardly spaced direction from the winch post.
   d. means for vertically supporting said rearward pointing end of the lever with a support bushing mounted within a support shackle having upstanding leg members, said leg members serving to stabilize the lever whereby the boat will be supported and stabilized by the keel support roller.
   e. means for securing said support shackle to said trailer tongue in a rearwardly spaced direction from the pivotal shackle.
   f. means for securing said keel support bracket bearing said keel support roller to the rearward pointing end of the lever, said rope alternately being detached from the boat and having connection means to the lever wherein winding the rope on the spool will cause the lever to pivot to launch the boat.

2. An attachment as defined in claim 1 including means for structurally stabilizing the hollow pivotal end of the lever by installing a horizontal pivot bushing within and abutting vertical inner sides of the hollow pivotal end of the lever within said pivotal coupling.

3. An attachment as defined in claim 1 including means for vertical adjustment of the keel support roller in relation to vertically supporting the forward keel of the boot during transit by concurrently, selectively, vertically locating and securing the pivotal coupling and the support bushing within the pivot shackle and the support shackle.

4. An attachment as defined in claim 1 including means for longitudinal adjustment of the keel support roller in relation to supporting a forward keel of the boat during transit by concurrently, selectively, longitudinally locating and securing the pivot shackle and the support shackle respectively on the boat trailer tongue.

5. An attachment as defined in claim 1 wherein said connection means includes means for securing a hook on a free end of the rope to a clevis attached to the lever supported on the support bushing in the support shackle whereby winding the rope on said winch lifts the attached keel support roller in a vertical arc along a bow portion of the boat resulting in an upward and a rearward component of force initiating launching of the boat from said boat trailer.

6. An attachment as defined in claim 1 including means for facilitating upward vertical movement of the keel support roller along the bow by fixing a keel support roller bushing concentrically within the keel support roller mounted on a bolt thereby reducing friction between said bolt, the keel support roller, and the bow.

7. An attachment as defined in claim 1 including means for facilitating return of the lever to a support position in the support shackle after launching the boat by inwardly and downwardly chamferring uppermost horizontal surfaces of the support shackle.

* * * * *